(12) United States Patent
Xiong et al.

(10) Patent No.: US 10,377,045 B2
(45) Date of Patent: Aug. 13, 2019

(54) ROBOTIC HAND

(71) Applicant: UBTECH Robotics Corp, Shenzhen (CN)

(72) Inventors: Youjun Xiong, Shenzhen (CN); Yong Fu, Shenzhen (CN); Hongyu Ding, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 109 days.

(21) Appl. No.: 15/811,725

(22) Filed: Nov. 14, 2017

(65) Prior Publication Data
US 2019/0091876 A1   Mar. 28, 2019

(30) Foreign Application Priority Data

Sep. 28, 2017   (CN) .................... 2017 2 1266851 U

(51) Int. Cl.
| | |
|---|---|
| *B25J 15/02* | (2006.01) |
| *B25J 15/08* | (2006.01) |
| *F16H 1/20* | (2006.01) |
| *F16H 1/28* | (2006.01) |
| *F16H 19/02* | (2006.01) |
| *F16H 19/00* | (2006.01) |
| *B25J 15/10* | (2006.01) |
| *F16H 1/22* | (2006.01) |

(52) U.S. Cl.
CPC .......... *B25J 15/0213* (2013.01); *B25J 15/10* (2013.01); *B25J 15/103* (2013.01); *F16H 1/222* (2013.01); *F16H 1/28* (2013.01); *F16H 19/001* (2013.01)

(58) Field of Classification Search
CPC .. B25J 15/0028; B25J 15/009; B25J 15/0206; B25J 15/0213; B25J 15/0253; B25J 15/026; B25J 15/08; B25J 15/086; B25J 15/10; B25J 15/103; F16H 1/18; F16H 1/203; F16H 1/22; F16H 1/222; F16H 1/227; F16H 1/28; F16H 19/001
See application file for complete search history.

(56) References Cited

U.S. PATENT DOCUMENTS

| | | | | |
|---|---|---|---|---|
| 3,202,449 | A * | 8/1965 | Lemelson | ............ B25J 15/0213 294/106 |
| 4,598,942 | A * | 7/1986 | Shum | ...................... B25J 15/103 294/106 |
| 6,217,094 | B1 * | 4/2001 | Hanaduka | .............. B25J 13/088 294/106 |
| 7,300,082 | B2 * | 11/2007 | Rogers | ................... B25J 13/085 294/104 |
| 9,200,425 | B2 * | 12/2015 | Takehana | ................. B25J 15/08 |

(Continued)

*Primary Examiner* — Adam D Rogers

(57) ABSTRACT

A robotic hand includes a servo housing, a printed circuit board (PCB), a motor, a planetary gear transmission assembly and a plurality of claws rotatably connected to the servo housing. The motor is electrically connected to the PCB. An input end of the planetary gear transmission assembly is connected to an output shaft of the motor, and an output end of the planetary gear transmission assembly includes a helical gear shaft and a number of helical gears that are engaged with the helical gear shaft and the claws. The helical gears correspond to the claws respectively. One end of each of the claws is rotatably connected to the servo housing, and the claws are rotatable toward or away from one another when driven by the helical gears.

10 Claims, 8 Drawing Sheets

(56) References Cited

U.S. PATENT DOCUMENTS

| | | | |
|---|---|---|---|
| 9,718,195 B1* | 8/2017 | Youmans | B25J 15/12 |
| 10,022,874 B1* | 7/2018 | Xiong | B25J 15/0213 |
| 10,081,111 B1* | 9/2018 | Xiong | B25J 15/10 |
| 2019/0091794 A1* | 3/2019 | Burger | B23K 11/115 |

* cited by examiner

ROBOTIC HAND

CROSS REFERENCE TO RELATED APPLICATIONS

This application claims priority to Chinese Patent Application No. 201721266851.6, filed Sep. 28, 2017, which is hereby incorporated by reference herein as if set forth in its entirety.

BACKGROUND

1. Technical Field

The present disclosure generally relates to robots, and particularly to a robotic hand.

2. Description of Related Art

The use of robotic hands in various applications is apparent today. For example, some toy mechanical hands have been designed for kids. Although conventional robotic hands can meet basic requirements, there is still a need to provide an improved one.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
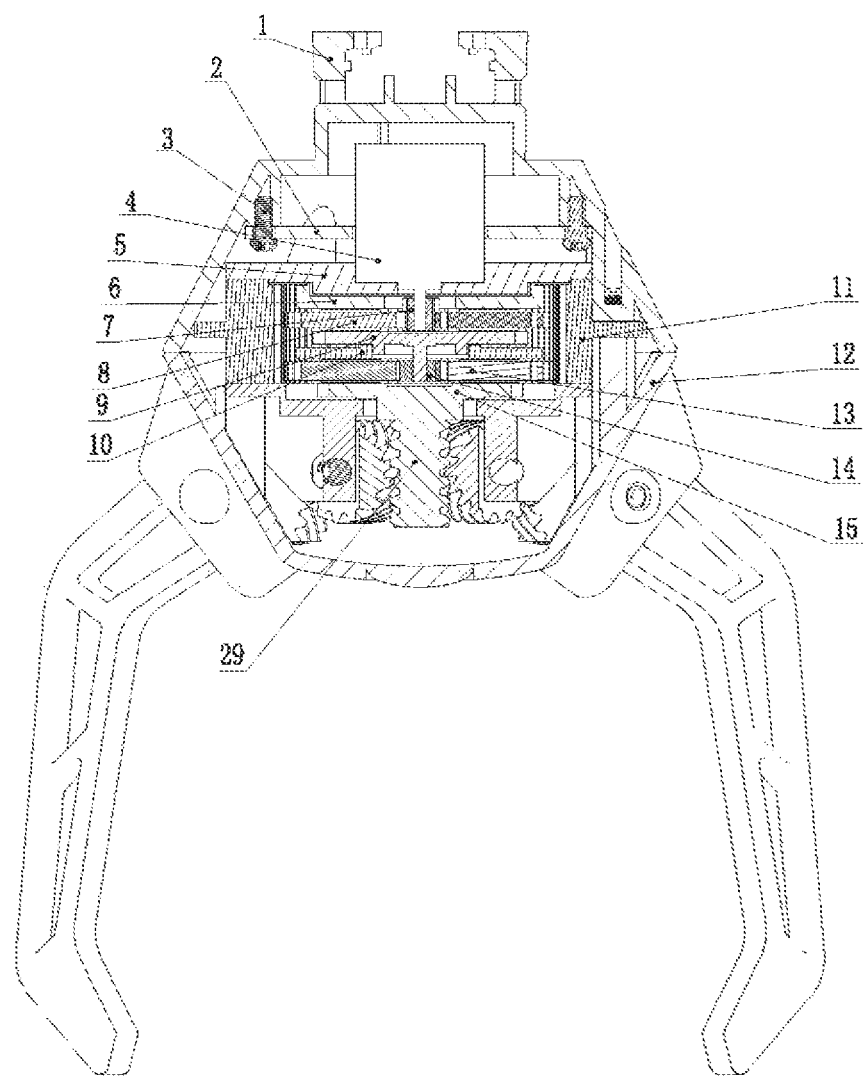
FIG. 1 is a first sectional view of a robotic hand in an open state according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
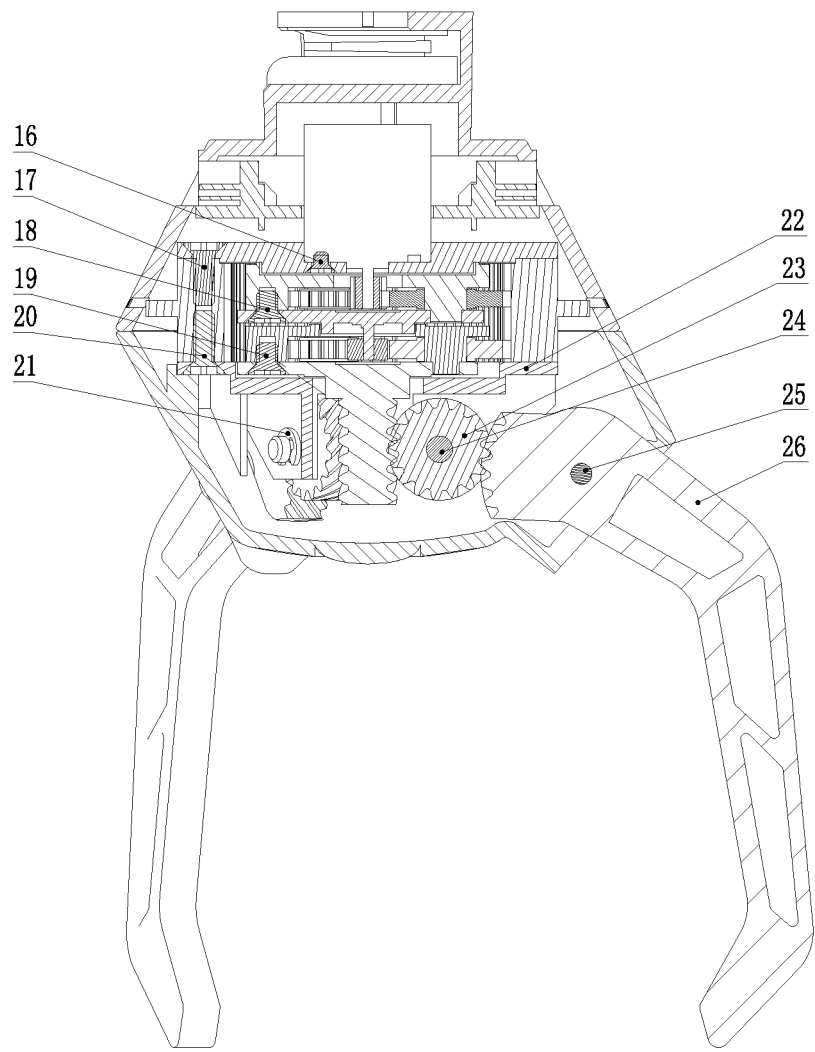
FIG. 2 is a second sectional view of the robotic hand of FIG. 1 in an open, state.
Figure 3:
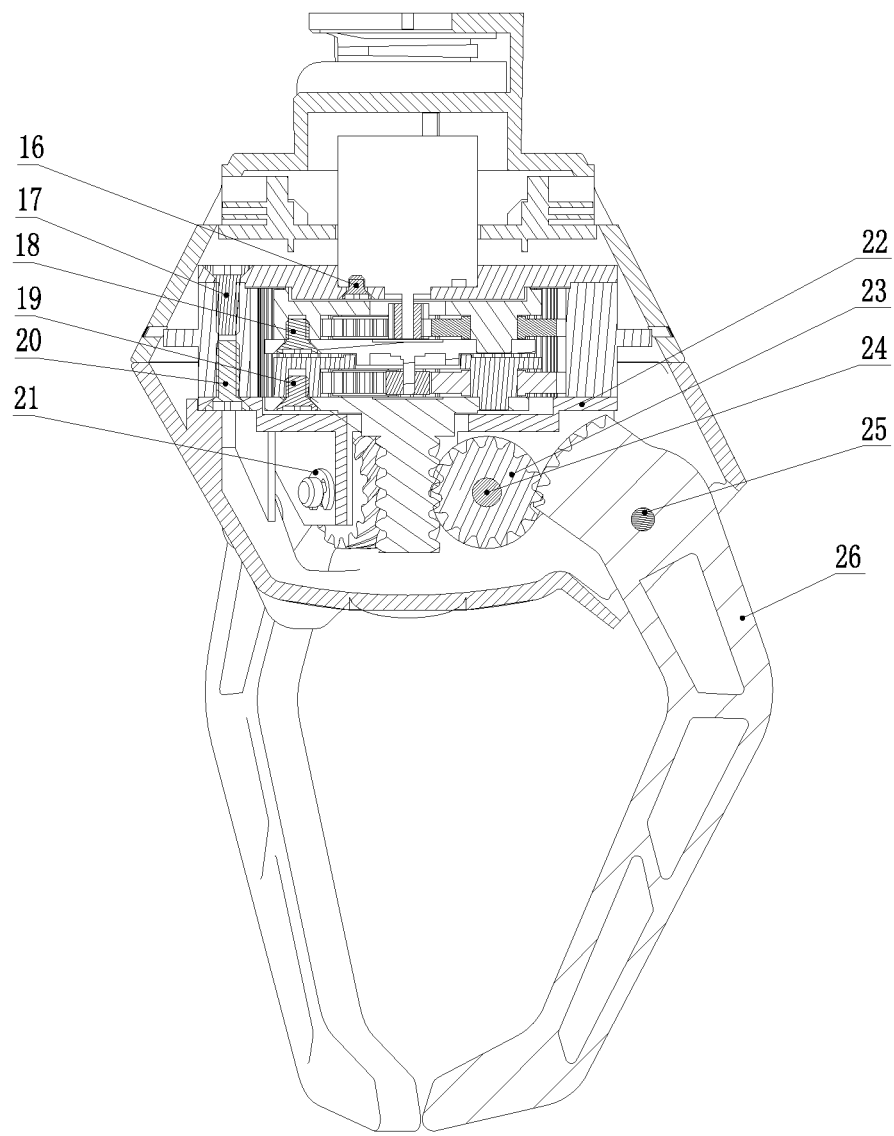
FIG. 3 is a sectional view of the robotic hand of FIG. 1 in a closed state.
Figure 4:
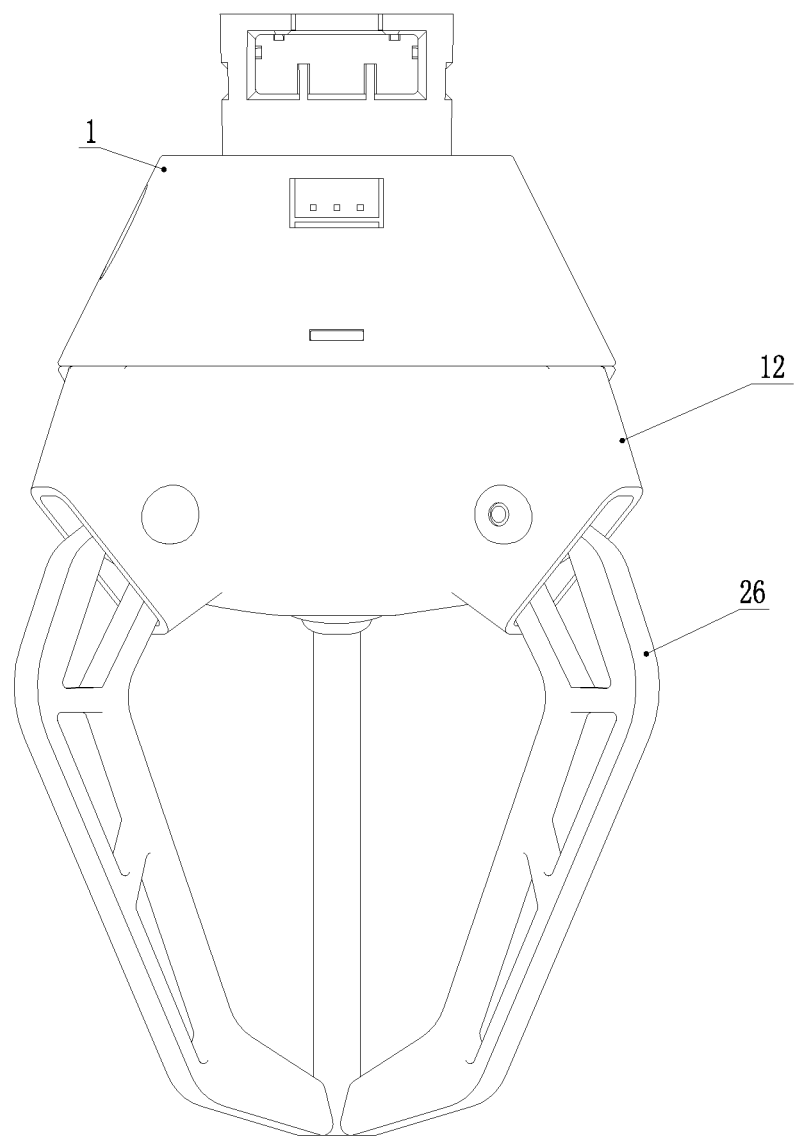
FIG. 4 is a front view of the robotic hand of FIG. 1 in a closed state.

Referring to FIGS. 1-4, in one embodiment, a robotic hand includes a servo housing, a printed circuit board (PCB) 2, a motor 4, a planetary gear transmission assembly and three claws 26. The PCB 2, the motor 4 and the planetary gear transmission assembly are arranged, from top to bottom, in the servo housing. The motor 4 is connected to the PCB 2 and can receive instructions from the PCB 2. The input end of the planetary gear transmission assembly is connected to an output shaft of the motor 4 and can rotate when driven by the motor 4. An output end of the planetary gear transmission assembly includes a helical gear shaft 29 and three helical gears 23. The helical gears 23 correspond to the claws 26 respectively. The helical gears 23 are engaged with the helical gear shaft 29 so as to be rotatable with respect to the helical gear shaft 29, which forms a transmission structure. The claws 26 are engaged with the helical gears 23 so as to be toward or away from one another when driven by the helical gears 23. Specifically, the claws 26 are rotatably connected to the servo housing and spaced apart from one another by equal distance. One end of each claw 26 is engaged with a corresponding helical gear 23, and the other end is a free end that is used to contact a to-be-grasped object. The helical gear shaft includes teeth for engaging the helical gears 23. As shown in FIGS. 1 and 2, when the helical gears 23 rotate in an anticlockwise direction, they drive the claws 26 to rotate away from one another. More specifically, the free ends of the claws 26 move away from one another. In this case, the robotic hand opens gradually. As shown in FIGS. 3 and 4, when the helical gears 23 rotate in a clockwise direction, they drive the claws 26 to rotate toward one another. More specifically, the free ends of the claws 26 move toward one another. In this case, the robotic hand closes gradually. With such configuration, the robotic hand can be used to grasp an object, such as a toy block. It should be understood that the number of the claws 26 can vary according to need.

The robotic hand of the embodiment can be used with building blocks. It can achieve a compact structure and meet functional requirements by using the planetary gear transmission assembly and the helical gear transmission assembly. When the PCB 2 sends an instruction to drive the motor 4 to rotate, the planetary gear transmission assembly is rotated and drives the helical gear shaft 29 and he helical gears 23 to rotate. The helical gears 23 rotate with respect to the helical gear shaft 29, which forms a cross-axis transmission assembly. The claws 26 are engaged with the helical gears 23 such that they can rotate toward or away from one another to grasp or release an object, such as a building block.

The planetary gear transmission assembly includes an upper cover 5, a lower cover 22, and a planetary gear transmission assembly of at least two stages arranged between the upper cover 5 and the lower cover 22. The planetary gear transmission assembly includes an input end connected to the motor 4 and an output end connected to the helical gear shaft 29. The helical gears 23 are rotatably connected to the lower cover 22. Specifically, the motor 4 is connected to the upper cover 5 via first screws 16. The upper cover 15 may define a recessed portion. One end of the motor 4 is received in the recessed portion and the output shaft of the motor 4 passes through an opening defined in the bottom of the recessed portion and connected to the planetary gear transmission assembly. The helical gears 23 are evenly arranged along a circumferential direction of the lower cover 22 in such way that a rotation axis of each helical gear 23 is substantially perpendicular to a rotation axis of the helical gear shaft 29. With such configuration, the claws 26 can have gripping power substantially the same with one another.

Figure 5:
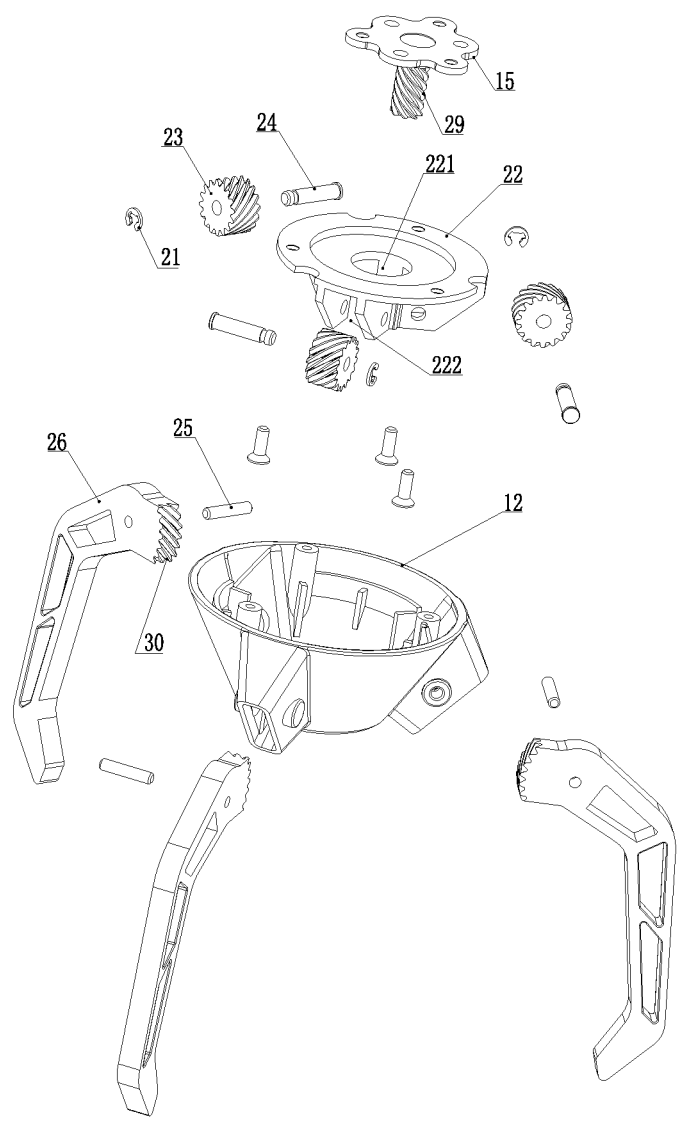
FIG. 5 is a partly exploded view of the robotic hand of FIG. 1.
Figure 6:
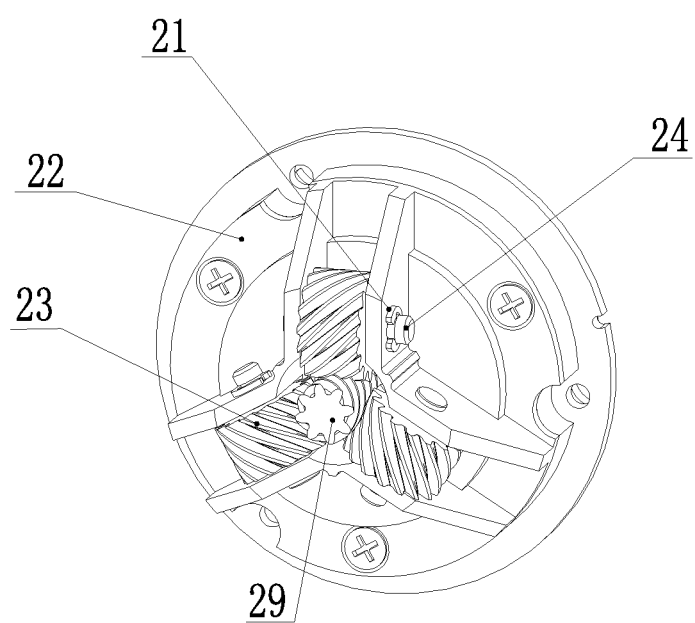
FIG. 6 is an isometric view of the robotic hand of FIG. 1.

Referring also to FIGS. 5 and 6, each of the helical gears 23 is rotatably connected to the lower cover 22 via an axle 24. Each axle 24 includes a retaining member 21 for holding one corresponding helical gear 23 on the axle 24. In one embodiment, the retaining member 21 is an elastic retaining ring that can apply an elastic pushing force to the corresponding helical gear 23 so as to prevent the helical gear 23 from moving along the axle 24. A through hole 221 penetrating the lower cover 22 is defined in the central area of the lower end cover 22. Three spaces 222 are formed in the lower cover 22 and arranged along the circumferential direction of the lower cover 22. Three helical gears 23 are respectively mounted in the three passages 222. One end of the helical gear shaft 29 passes through the through hole 221 and meshes with the three helical gears 23 to form a cross-axis transmission assembly.

Each of the claws 26 includes an arc-shaped end having teeth 30 for engaging one corresponding helical gear 23 so as to rotate when driven by the helical gears 23.

Each stage of the planetary gear transmission assembly includes a sun gear, a plurality of planetary gears that are engaged with the sun gear, a gear carrier where the planetary gears are mounted, and a ring gear that is arranged around the gear carrier and is engaged with the planetary gears. The gear carrier includes a mounting panel, a plurality of shafts connected to the mounting panel, and a fixing panel fixed to the mounting panel. The planetary gears are respectively rotatably connected to the shafts, and one end of each of the shafts is received in the fixing panel.

It should be understood that the planetary gear transmission assembly may be two-staged or three-staged. A two-staged planetary gear transmission assembly is preferable considering the cost and function needed to achieve. The number of the planetary gears of each stage planetary gear mechanism is preferably three. A two-stage planetary gear transmission assembly will be described in detail as an example.

Figure 7:
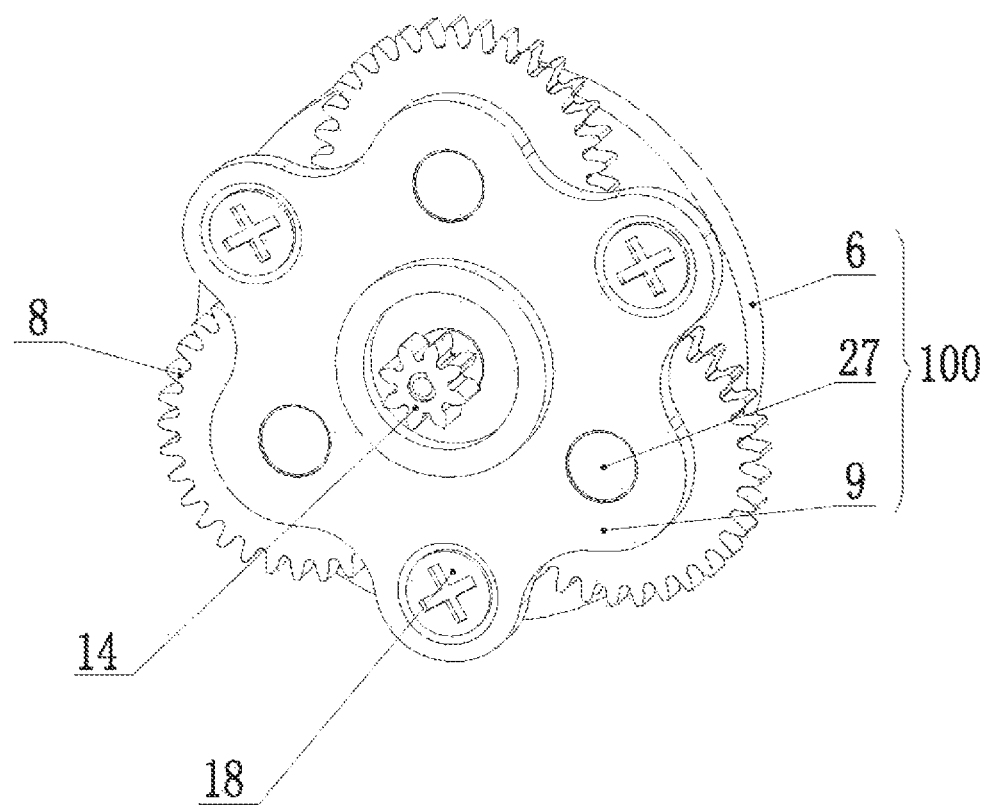
FIG. 7 is an isometric view of an assembly including a first stage planetary gear transmission mechanism and a second-stage sun gear.
Figure 8:
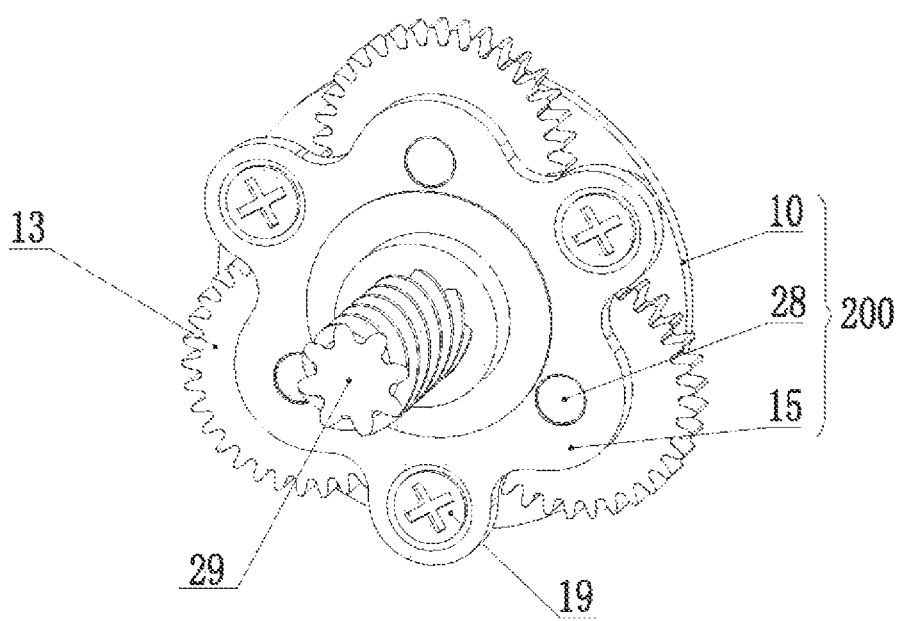
FIG. 8 is an isometric view of an assembly including a second stage planetary gear transmission mechanism and a helical gear.

Referring to FIGS. 7 and 8, the planetary gear transmission assembly includes a first stage planetary gear transmission mechanism and a second stage planetary gear transmission mechanism. The first stage planetary gear transmission mechanism includes a sun gear 7 that serves as an input end of the planetary gear transmission assembly and is connected to the output shaft of the motor 4, three planetary gears 8 that are engaged with the sun gear 7, a first stage gear carrier 100 where the planetary gears 8 are mounted, and a ring gear 11 that is arranged around the first stage gear carrier 100 and is engaged with the planetary gears 8. The first stage gear carrier 100 includes a mounting panel 6, three shafts 27 that are connected to the mounting panel 6, and a fixing panel 9 fixed to the mounting panel 6 via the shafts 27 and serves as the output end of the first stage planetary gear transmission mechanism. In one embodiment, one end of each of the shafts 27 is received in the fixing panel 9. The fixing panel 9 is fixed to the mounting panel 6 via second screws 18. Opposite ends of each of the shafts 27 and the second screws 18 are fixed to the fixing panel 9 and the mounting panel 6. In the embodiment, a power gear of the motor 4 may serve as the sun gear 7.

The second stage planetary gear transmission mechanism includes a sun gear 14 that serves as an input end of the second stage planetary gear transmission mechanism and is connected to the fixing panel 9, three planetary gears 13 that are engaged with the sun gear 7, a second stage gear carrier 200 where the planetary gears 13 are mounted that serves as the output end of the planetary gear transmission assembly, and the ring gear 11 that is arranged around the second stage gear carrier 200 and is engaged with the planetary gears 13. The second stage gear carrier 200 includes a mounting panel 10, three shafts 28 that are connected to the mounting panel 10, and a fixing panel 15 that is fixed to the mounting panel 10 via the shafts 28 and serves as the output end of the planetary gear transmission assembly. In one embodiment, one end of each of the shafts 28 is received in the fixing panel 15. The sun gear 14 is connected to a shaft of the fixing panel 9. The fixing panel 15 is fixed to the mounting panel 10 via third screws 19, and serves as the power/torque outputting member of the planetary gear transmission assembly. The helical gear shaft 29 protrudes from the fixing panel 15. Opposite ends of each of the shafts 28 and the third screws 19 are fixed to the fixing panel 15 and the mounting panel 10.

The ring gear 11 is shared by the first stage planetary gear transmission mechanism and the second stage planetary gear transmission mechanism, which saves cost and space and facilitates the assembling/disassembling. The ring gear 11 is securely connected to the upper cover 5 through fourth screws 17, and securely connected to the lower cover 22 through fifth screws 20.

The servo housing includes an upper housing 1 and a lower housing 12 that are connected to each other. The PCB 2 is fixed to the upper housing 1 via sixth screws 3. The claws 26 are connected to the lower housing 12. The upper housing 1, the ring gear 11 and the lower housing 12 are connected to one another via screws. As shown in FIG. 5, each claw 26 is rotatably connected to the lower housing 12 via a pin 25. Each claw 26 is rotatable with respect to the corresponding pin 25, while the pin 25 is fixed to the lower housing 12.

In the embodiment, the upper housing, the lower housing and the planetary gear transmission assembly are connected to one another via screws.

The operation of the robotic hand is described as follows. The PCB 2 sends an instruction to drive the motor 4 to operate. The motor 4 then rotates the sun gear 7 which drives the planetary gears 8 to rotate. Since the three planetary gears 8 are engaged with the ring gear 11, the planetary gears 8, together with the mounting panel 6 and the fixing panel 9, revolve around the sun gear 7. Since the sun gear 14 of the second stage planetary gear transmission mechanism is fixed to the fixing panel 9, the fixing panel 9 thus not only functions as the outputting member of the first stage planetary gear transmission mechanism but also the inputting member of the second stage planetary gear transmission mechanism. Similarly, the sun gear 14 drives the planetary gears 13 to rotate. Since the planetary gears 13 are engaged with ring gear 11, the planetary gears 13, together with the mounting panel 10 and the fixing panel 15, revolve around the sun gear 14. Since the helical gear shaft 29 protrudes from the fixing panel 15 and serves as the outputting shaft of the planetary gear transmission assembly, it drives the helical gears 23 to rotate. The claws 26 each include teeth 30 that are engaged with the helical gears 23, which enables the claws 26 to rotate, causing the robotic hand to open or close.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robotic hand comprising a servo housing, a printed circuit board (PCB), a motor, a planetary gear transmission assembly and a plurality of claws rotatably connected to the servo housing, wherein the motor is electrically connected to the PCB, an input end of the planetary gear transmission assembly is connected to an output shaft of the motor, an output end of the planetary gear transmission assembly comprises a helical gear shaft and a plurality of helical gears that are engaged with the helical gear shaft and the claws, the helical gears correspond to the claws respectively, one end of each of the claws is rotatably connected to the servo housing, and the claws are rotatable toward or away from one another when driven by the helical gears.

2. The robotic hand of claim 1, wherein the planetary gear transmission assembly includes an upper cover, a lower cover and a planetary gear transmission mechanism of at least two stages arranged between the upper cover and the lower cover, the planetary gear transmission mechanism comprises an input end connected to the output shaft of the motor and an output end connected to the helical gear shaft, and the helical gears are rotatably connected to the lower cover.

3. The robotic hand of claim 2, wherein each of the helical gears is rotatably connected to the lower cover via an axle, and each axle comprises a retaining member for holding one of the corresponding helical gears on each axle.

4. The robotic hand of claim 2, wherein each of the claws comprises an arc-shaped end comprising teeth for engaging one of the corresponding helical gears.

5. The robotic hand of claim 2, wherein the helical gears are evenly arranged along a circumferential direction of the lower cover in such way that a rotation axis of each helical gear is substantially perpendicular to a rotation axis of the helical gear shaft.

6. The robotic hand of claim 2, wherein each stage of the planetary gear transmission mechanism comprises a sun gear, a plurality of planetary gears that are engaged with the sun gear, a gear carrier where the planetary gears are mounted, and a ring gear that is arranged around the gear carrier and is engaged with the planetary gears.

7. The robotic hand of claim 6, wherein the gear carrier comprises a mounting panel, a plurality of shafts connected to the mounting panel, and a fixing panel fixed to the mounting panel, the planetary gears are respectively rotatably connected to the shafts, and one end of each of the shafts is received in the fixing panel.

8. The robotic hand of claim 6, wherein the ring gear is utilized by each stage of the planetary gear transmission mechanism.

9. The robotic hand of claim 1, the servo housing comprises an upper housing and a lower housing that are connected to each other, the PCB is fixed to the upper housing, and the claws are connected to the lower housing.

10. The robotic hand of claim 9, wherein each of the claws is rotatably connected to the lower housing via a pin.

* * * * *